(12) United States Patent
Carratura

(10) Patent No.: US 9,629,504 B2
(45) Date of Patent: Apr. 25, 2017

(54) SKEWER AND SKEWER HANDLING DEVICE

(71) Applicant: Ralph S. Carratura, Allison Park, PA (US)

(72) Inventor: Ralph S. Carratura, Allison Park, PA (US)

( * ) Notice: Subject to any disclaimer, the term of this patent is extended or adjusted under 35 U.S.C. 154(b) by 327 days.

(21) Appl. No.: 14/505,521

(22) Filed: Oct. 3, 2014

(65) Prior Publication Data

US 2016/0095471 A1    Apr. 7, 2016

(51) Int. Cl.
    *A47J 37/07*    (2006.01)
    *A47J 43/28*    (2006.01)

(52) U.S. Cl.
    CPC ................... *A47J 43/283* (2013.01)

(58) Field of Classification Search
    CPC .............. A47J 37/049; A47J 43/283
    USPC ....................................... 99/421 R
    See application file for complete search history.

(56) References Cited

U.S. PATENT DOCUMENTS

| | | | | |
|---|---|---|---|---|
| 2,057,421 A | * | 10/1936 | Dickson | A47J 37/041 126/41 B |
| 3,169,470 A | * | 2/1965 | Oatley | A47J 37/041 99/340 |
| 3,359,888 A | * | 12/1967 | Deege | A47J 37/0745 99/421 HV |
| 2004/0079239 A1 | * | 4/2004 | Chen | A47J 37/042 99/419 |

\* cited by examiner

*Primary Examiner* — Arthur O Hall
*Assistant Examiner* — Adam J Rogers
(74) *Attorney, Agent, or Firm* — Karen Tang-Wai Sutton

(57) ABSTRACT

An improved skewer (30 60) and skewer handling device (10) used for manipulating shish kebobs. The improved skewer is comprised of a mating shank (30*a*) having an array of mating surfaces, such as teeth or grooves, formed into the shank. The handling device is comprised of a pair of opposed handles (10*a* 10*aa*) joined by linear actuator (20*a* 20*b*) turning a rod (10*d*) disposed with a skewer engaging means (10*e*), the mating surfaces of the shank configured to mate with the skewer engaging gear. A shaft (10*b*) is affixed to the handles at one end and is formed with a guide (10*h*) at an opposing end, the guide selected to maintain the position of the mating surfaces of the mating shank with the skewer engaging gear. An adaptor (50) is also provided to allow conversion of prior art skewers (52 54) to be used with the handling device (10).

9 Claims, 12 Drawing Sheets

SKEWER AND SKEWER HANDLING DEVICE

TECHNICAL FIELD

The present invention pertains to the field of cooking implements. More particularly, the present invention pertains to hand-held gadgets for picking up and rotating shish kabob skewers during the cooking process.

BACKGROUND OF THE INVENTION

Threading chunks of meat and vegetables onto skewers and cooking the food over a grill is a popular method of preparing such food, the skewered food and skewer collectively referred to as a "shish kebob". Skewers are typically sharpened wooden sticks or metal sticks with a sharp point at one end, and a handle configured as a loop or other flattened, non-sharp design, at an opposing end. The food cooked on a skewer can be eaten directly off the skewer, or removed from the skewer before consumption.

As grilling (or broiling) involves heating food from one side only, it is imperative to pick up and rotate the shish kebob from time to time to ensure even cooking, but the skewer design is problematic: the shish kebob is heavy yet must be rotated by grasping one end configured simply as a skinny stick, or some other small, hard to grasp handle in the case of metal skewers. In particular, reusable metal skewers become extremely hot when placed on a grill, and the tiny handle is very difficult to grasp securely with a bulky oven mitt or other heat protective cloth, much less adequately rotate the shish kebob. The awkward skewer design thus causes the shish kebob to be dropped, have some food chunks fall off by being accidentally pushed off the sharp tip of the skewer by an oven mitt trying to grasp a larger portion of the handle end, and equally annoyingly, the shish kebob often just cannot be rotated exactly as desired due to difficulties created by the skewer design.

Another common problem with the traditional skewer design is that the food on the skewer itself often fails to rotate with the skewer, so even when the skewer is flipped over, some of the food on the skewer does not rotate and hence the uncooked side is still facing upwards and must be manually turned with a fork or other implement. Aside from being annoying, the use of an external fork or other implement can cause cross-contamination of foods because there is a tendency to use the same long-handled fork or tongs to turn over vegetables, chicken, steak, etc., and even if multiple sets of tongs, forks, and other implements are used to avoid cross-contamination, the increased number of tools around the grill or in the kitchen becomes unwieldy and confusing.

What is needed is a hand-held device that is able to easily pick up, rotate, and orient shish kebobs as desired. What is also needed is a skewer compatible with the hand-held device that improves the cooking experience by better securing the food, reduces the risks of cross-contamination, and eliminates the clutter of a variety of cooking implements currently required for safe cooking.

DISCLOSURE OF THE INVENTION

Accordingly, in a first aspect of the invention, an apparatus for manipulating a skewer having a mating surface at one end, the apparatus comprising a rod including a skewer engaging means having mating surfaces at one end, a guide parallel to the rod, and means to rotate the rod, whereby mating of the skewer engaging means with the mating surface of the skewer is maintained by the guide, and means to rotate the rod results in rotation of the mated skewer.

Also, in accord with the first aspect of the invention, the means to rotate the rod is provided as a rack and pinion system, wherein a pinion is affixed to an end of the rod opposite the skewer engaging means, and the pinion is positioned so as to engage a rack, whereby the pinion travels along a length of the rack when the rod is rotated Still also in accord with the first aspect of the invention, the guide and the rod are in spaced apart relationship, and the spaced apart relationship is a same width as a width of a portion of the mating shank upon which the mating surfaces are formed.

Still also in accord with the first aspect of the invention, a handle is affixed to the rack and adapted to receive an end of the rod, the handle facilitating rotation of the rod.

Even still also in accord with the first aspect of the invention, the apparatus if further comprised of a shaft affixed at a first end to the handle, and formed with the guide at the opposed end of the shaft. The shaft may be provided as a hollow tube in some embodiments.

In accord with a second aspect of the invention, an improved skewer is provided for use with the apparatus for manipulating the skewer, the skewer provided as a food holding portion with a tip at one end, a mating shank formed with mating structures at an opposed end, and a guide rest positioned between the mating shank and the food holding portion. The mating structures are selected to mate with the mating surfaces of the skewer engaging means, and a shape of the guide rest is selected to complement a shape of the guide.

In accord with a third aspect of the invention, an adaptor apparatus for use with a traditional skewer and the apparatus for manipulating improved skewers is provided, the adaptor apparatus comprised of means for receiving and holding an end of a skewer and an opposed mating shank having an array of mating surfaces configured to mate with an array of compatible mating surfaces of the skewer engaging means. In a first embodiment of the adaptor apparatus, the means for receiving and holding the end of the skewer is provided to receive and hold a wooden skewer end, and in a second embodiment of the adaptor apparatus, the means for receiving and holding the end of the skewer is provided to receive and hold a formed end of a metal skewer, typically presented as a loop or other regular shape.

BRIEF DESCRIPTION OF THE DRAWINGS

The features and advantages of the invention will become apparent from a consideration of the subsequent detailed description presented in connection with accompanying drawings, in which.

DRAWINGS LIST OF REFERENCE NUMERALS

Figure 1:
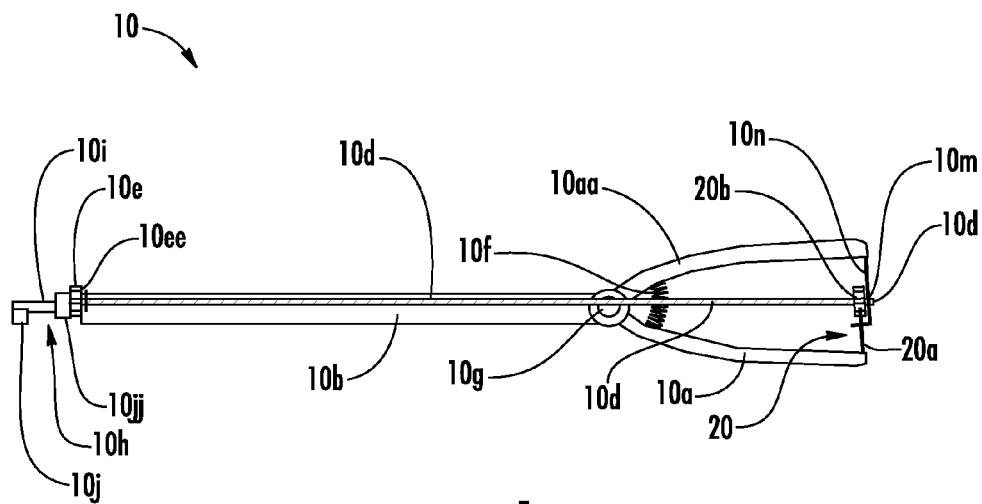
FIG. 1 is a side elevation view of a skewer handling device according to the invention.

The following is a list of reference labels used in the drawings to label components of different embodiments of the invention, and the names of the indicated components.
10 handling device
10a first handle
10aa second handle
10b shaft
10d rod
10e skewer engaging means
10ee tooth or teeth
10f spring
10g pivot point
10h guide
10i support
10j primary guide
10jj secondary guide
10k recess
10m aperture
10n handle flange
20 linear actuator (creates motion in a straight line)
20a rack
20b pinion
20c tooth or teeth
20c release
30 skewer
30a mating shank
30b flange
30c food receiving portion
30d tooth or teeth
30e terminal end of shank
30f groove or grooves
30g guide rest
30h tip
40 portion of food
50 adaptor
50a holding means
52 metal skewer
52a loop of metal skewer
54 wooden skewer (skewer with no formed end holder)
60 multi-pronged skewer

DETAILED DESCRIPTION

An improved skewer 30 60 and a skewer handling device 10 according to the invention is shown in FIGS. 1-13.

Figure 5:
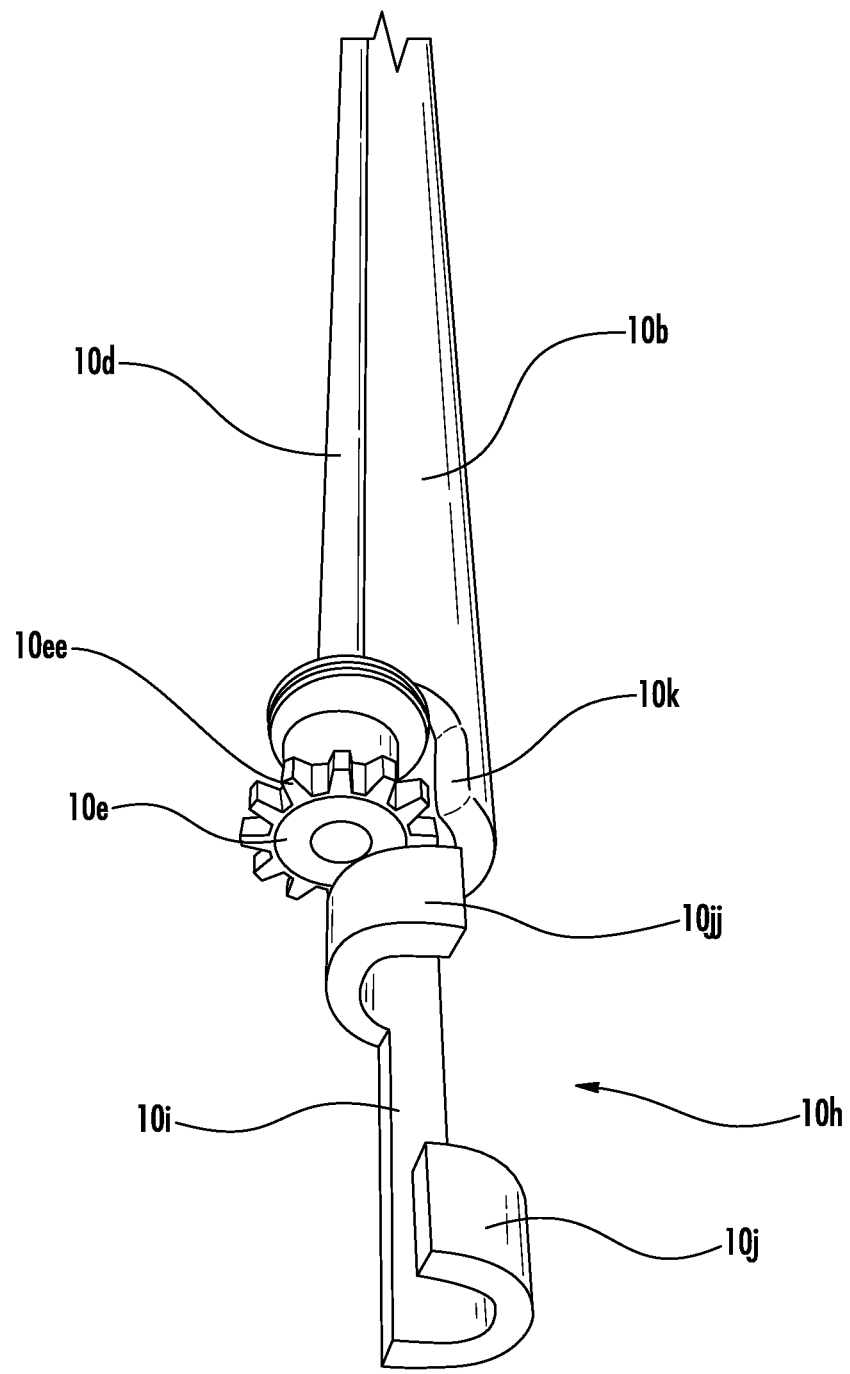
FIG. 5 is a first perspective view of a skewer engaging portion of the skewer handling device.
Figure 6:
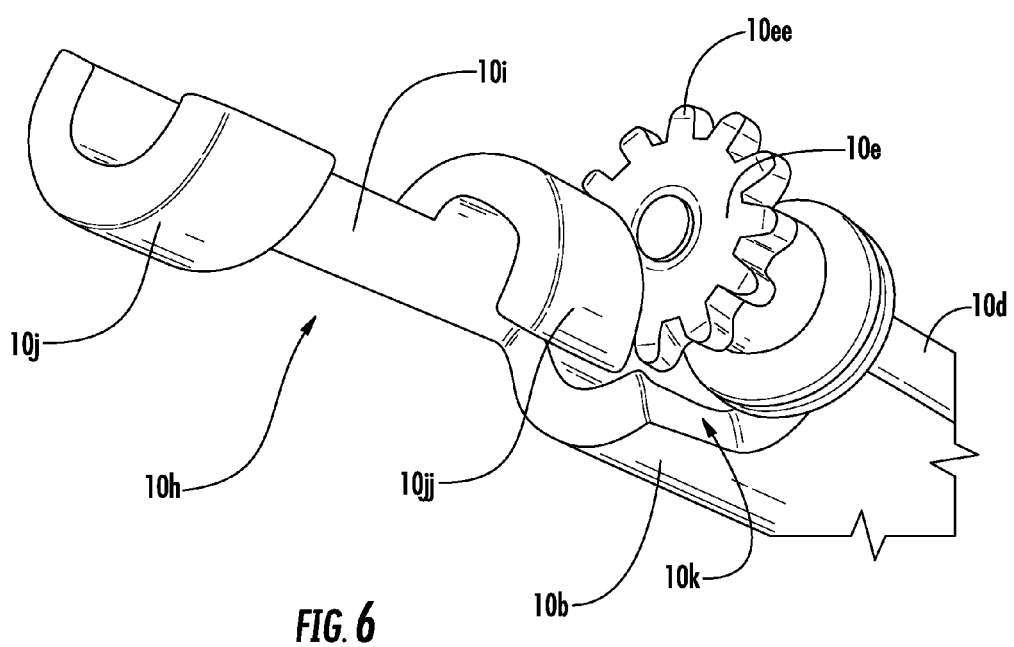
FIG. 6 is a second perspective view of a skewer engaging portion of the skewer handling device.
Figure 7:
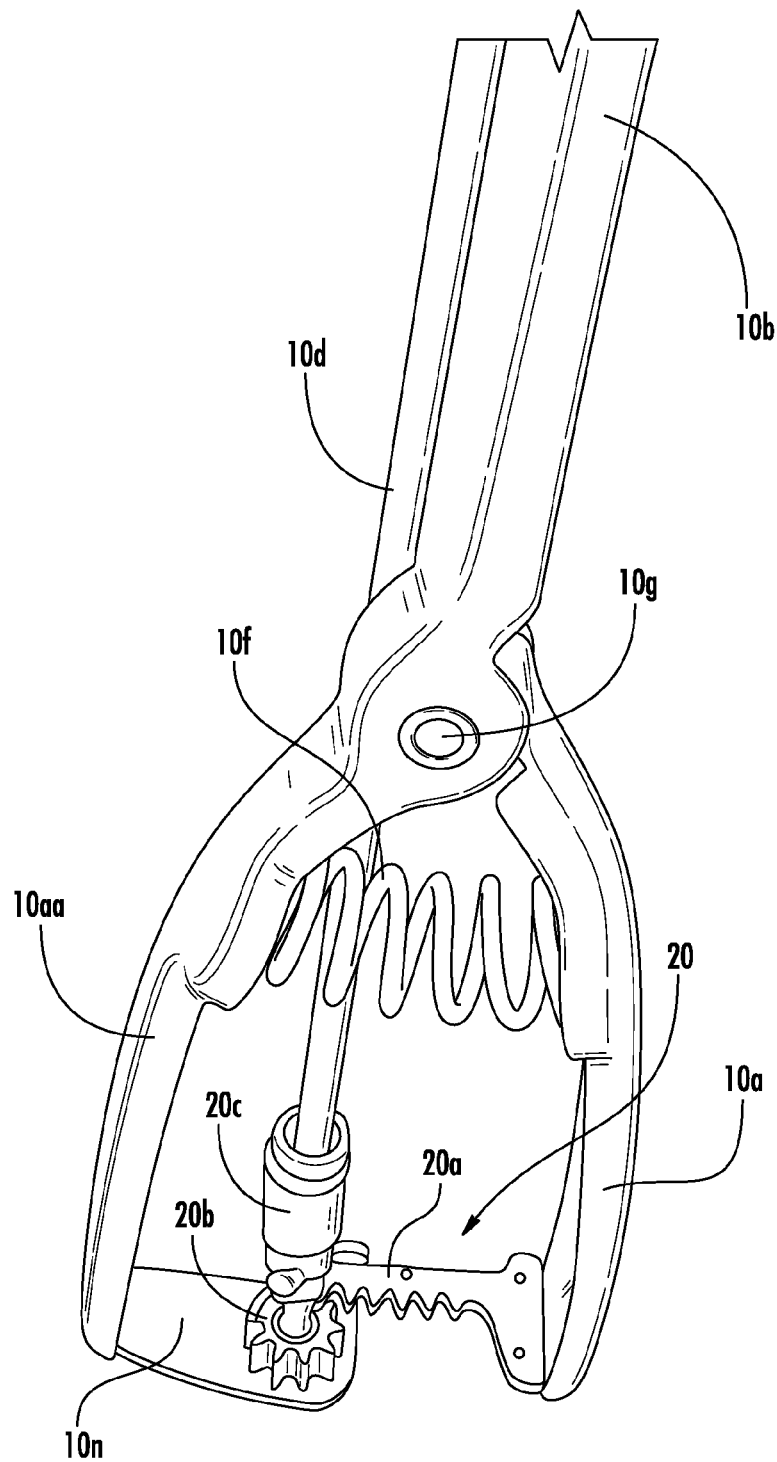
FIG. 7 is a first perspective view of a handle portion of the skewer handling device shown in FIG. 1.
Figure 8:
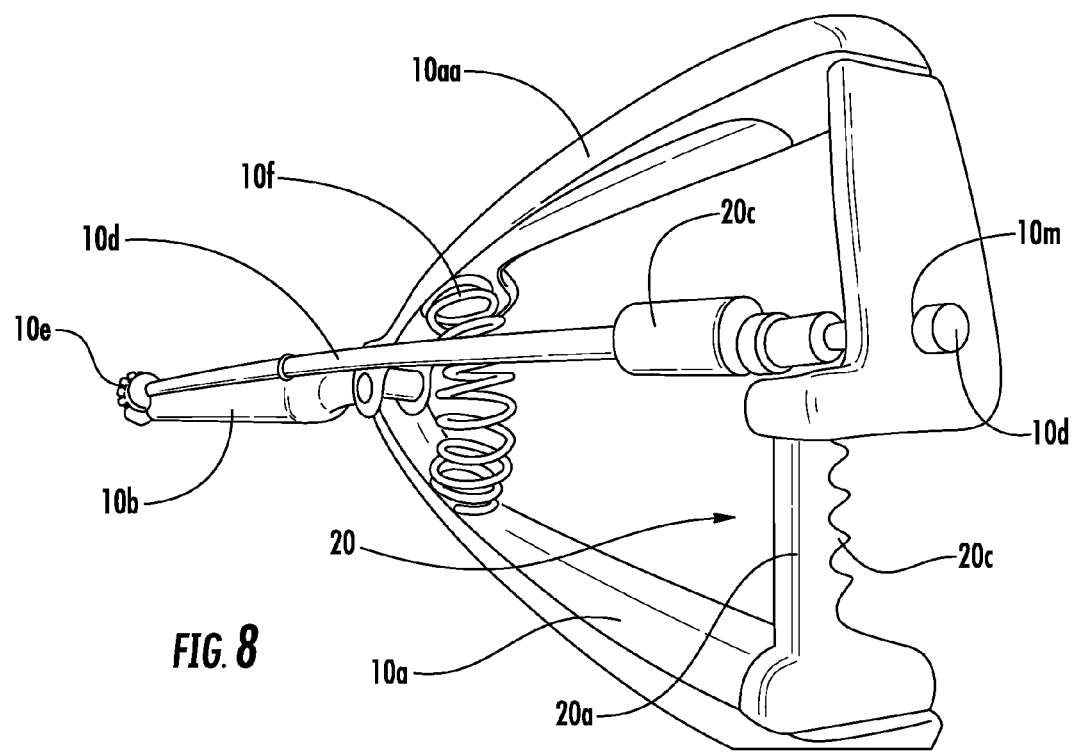
FIG. 8 is a second perspective view of the handle portion of the skewer handling device shown in FIG. 1.
Figure 9:
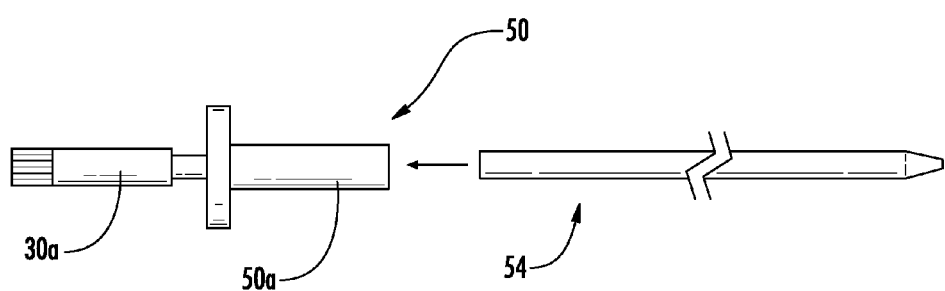
FIGS. 9 and 10 are side elevation views of two types of adaptor or skewer conversion pieces.
Figure 10:
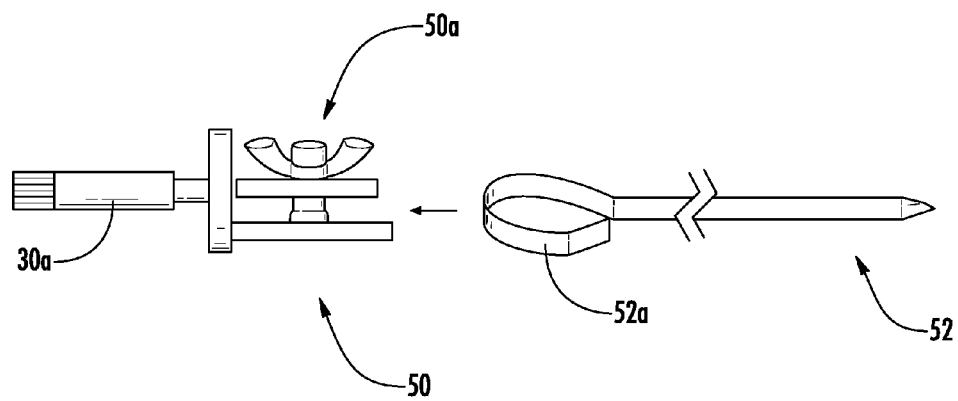

Turning now to FIG. 1 and FIGS. 5-8, a handling device 10, having a proximal end and a distal end, is comprised of a first handle 10a and a second handle 10aa at the proximal end and a guide 10h formed into the distal end, with a shaft 10b sandwiched between the handles 10a 10aa and the guide 10h. In FIGS. 5-6, the guide 10h is further comprised of a primary guide 10j and a secondary guide 10jj, the guides 10j 10jj formed by notching and removing portions of the shaft terminal end (found at the distal end of the device 10) thus creating a pair of parallel, mirror-image "C" channels held in spaced apart relationship by a support 10i, which is a remaining portion of the shaft 10b after formation of the primary and secondary guides. The inventor notes that the guide 10h can also be comprised of just the support 10i and the primary guide 10j located at the terminal end of the shaft 10b, and the guide 10j does not have to be a c-channel but any shape compatible with a shape of a guide rest 30g disposed at one end of a mating shank 30a of the improved skewer 30 60.

A rod 10d aligned in parallel with the shaft 10b is disposed with a skewer engaging means 10e at a distal end of the rod 10d and a pinion 20b at a proximal end of the rod 10d. An array of teeth 10ee are formed into the skewer engaging means 10e. The skewer engaging means 10e is nestled into a recess 10k formed into the shaft 10b. The shaft 10b is typically disposed as a hollow tube, and in some embodiments, not shown, the rod 10d is at least partially housed within the shaft 10b.

The handles 10a 10aa each have a proximal and a distal end, and are pivotably coupled to one another at the distal end at a pivot point 10g and also by a spring 10f. At the proximal end of the handles 10a 10aa, the first handle 10a is formed with a rack 20a, and the second handle 10aa is formed with a handle flange 10n. An aperture 10m is formed into the handle flange 10n, into which the proximal end of the rod 10d is inserted, positioning the teeth of the pinion 20b so as to mesh with teeth 20c of the rack 20a. When a user squeezes the handles 10a 10aa together, the spring is compressed and the pinion 20b travels along the rack 20a, turning the rod 10d and the skewer engaging means 10e attached at the distal end of the rod 10d.

Figure 2:
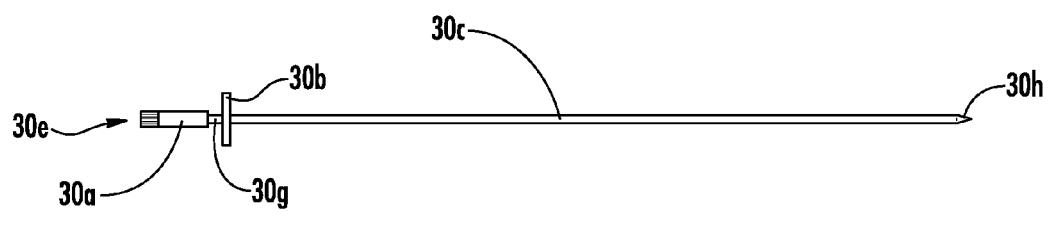
FIG. 2 is a side elevation view of an improved skewer according to the invention.
Figure 2A:
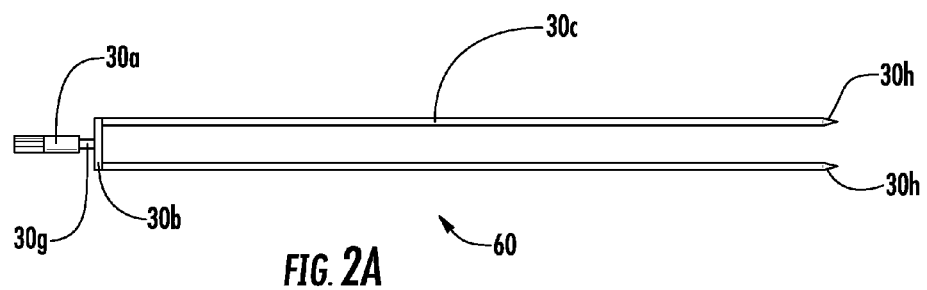
FIGS. 2A-D are side elevation views of improved multi-pronged skewers according to the invention.
Figure 2B:
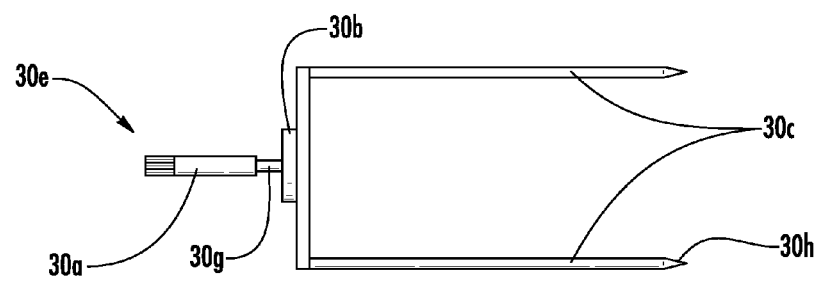
Figure 2C:
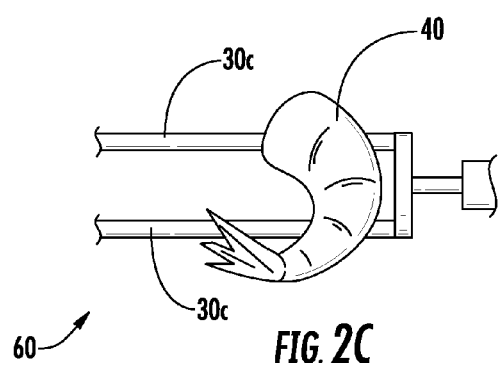
Figure 3:
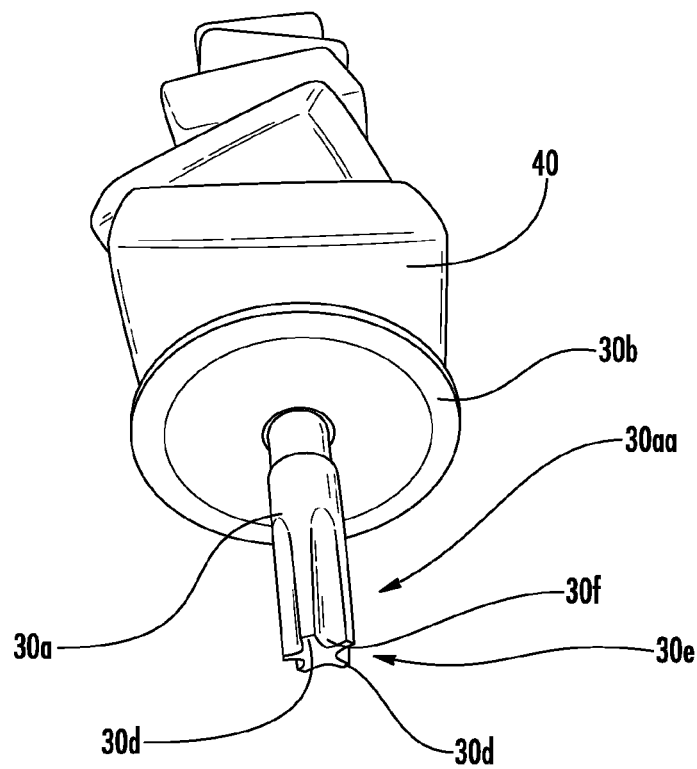
FIG. 3 is first perspective view of a mating shank of the improved skewer according to the invention.
Figure 4:
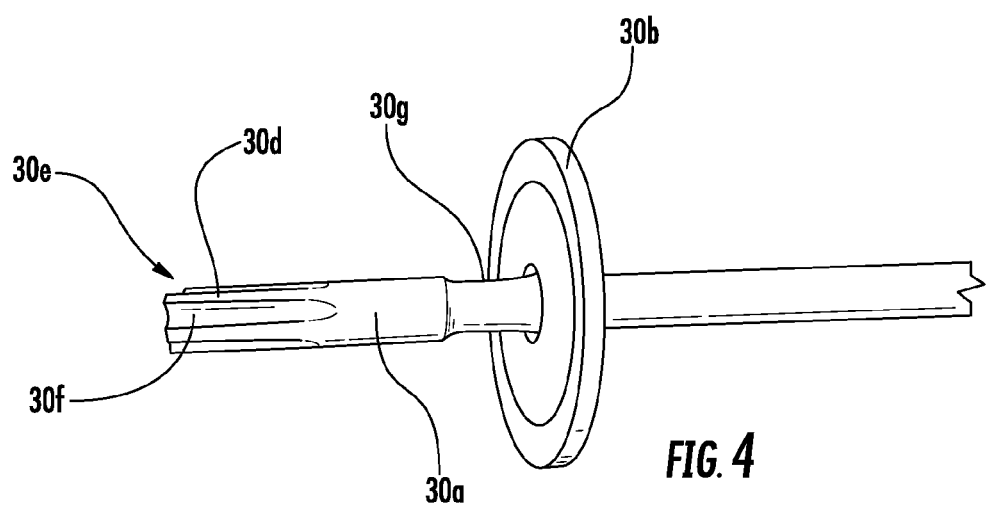
FIG. 4 is a side elevation view of the mating shank of the improved skewer according to the invention.

Turning now to FIGS. 2-4, a skewer 30 60 is comprised of a food receiving portion 30c defined by a tip 30h at one end, the food receiving portion terminating at a flange 30b, and at an opposed end, disposed as a coupling or mating shank 30a. The flange 30b prevents a portion of food 40 threaded over the tip 30h and onto the food receiving portion 30c from contacting the mating shank 30a. For multi-pronged skewers 60, the flange 30b is optional so long as the configuration of the prongs does not allow a portion of food 40 to slide onto the mating shank 30a. The guide rest 30g is formed below the flange 30b along a length of the mating shank. The mating shank 30a in disposed with mating surfaces at its terminal end 30e, in the Figures shown as an array of grooves 30f and teeth 30d. Regardless of the number of prongs, the improved skewer according to the invention 30 60 is disposed with a mating shank at one end of the skewer.

The grooves 30f and teeth 30d are sized and shaped to mate with the skewer engaging means 10e of the handling device 10. The mating shank 30a shown in the Figures is generally cylindrical however other cross-sections are appropriate, so long as the grooves 30f, teeth 30d or other mating surfaces formed on the shank 30a are adapted to mesh with the teeth 10ee of the skewer engaging means 10e.

Turning now to FIGS. 2A-2D, the Figures show multi-pronged skewer 60 embodiments, and the inventor has noted that multi-pronged skewer systems having two or more food holding portions 30c are useful for better securing the food and particularly for preventing larger and/or heavier portions of food from moving independently on the skewers, requiring tongs, forks or other external implements to be used to turn the food over when it fails to turn when the skewer is turned. Other uses for multi-pronged skewers 60 according to the invention include the ability to use the skewer 60 and the handling device 10 to turn over foods such as chicken thighs and steaks easily without the fear of cross-contamination between different types of foods. For instance, a first multi-pronged skewer could be used for just turning over pieces of chicken, and a second multi-pronged skewer could be used for turning over pork chops, in a "fork-like" manner. Alternatively, a variety of single and multi-pronged skewers can be inserted into raw food prior to cooking and then using the handling device 10, flipped as desired, completely eliminating the danger of cross-contamination or the requirement of secondary handling the raw or partially cooked food with other implements.

Figure 2D:
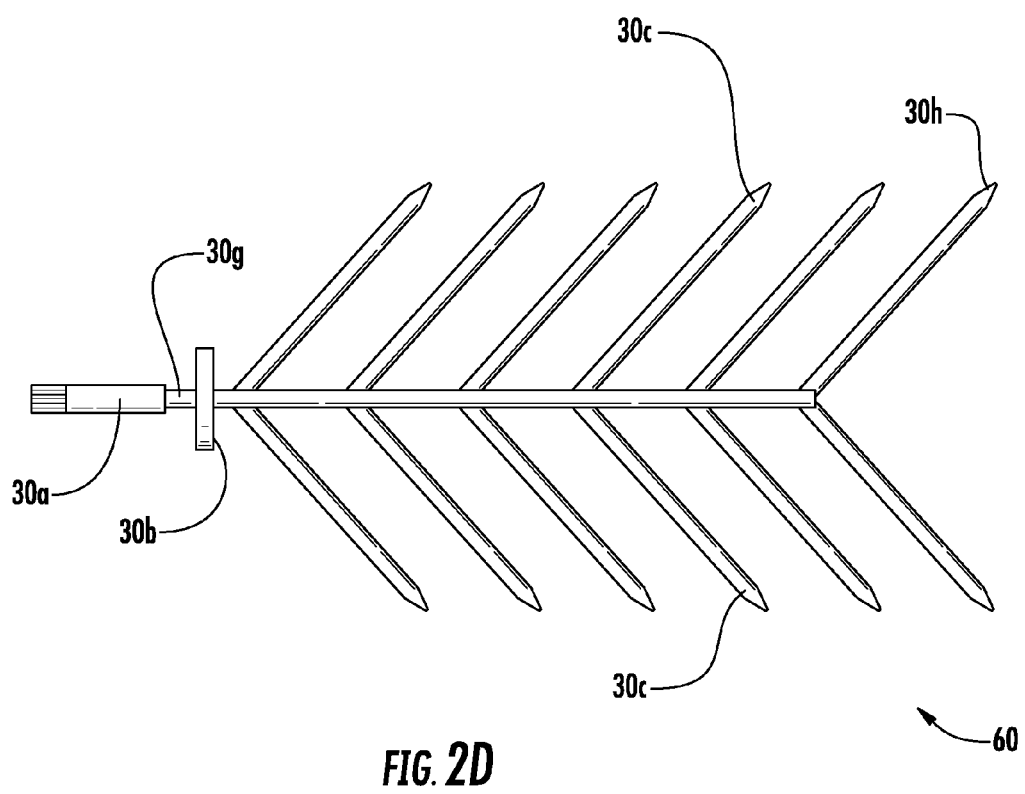

The distance between the prongs typically ranges between 0.5-4 inches, and a number of prongs and a physical arrangement of the prongs can vary widely, as shown in the Figures. In FIG. 2D, for instance, a "tree" arrangement of prongs conveniently cooks large amounts of food in an attractive arrangement, while the "fork" arrangements in FIGS. 2A-2C can be used in a variety of ways, such as to secure heavy or larger foods, such as chicken thighs, to prevent portions of food from twisting on the skewer by piercing the same portion of food with two or more prongs, as well as skewering individual portions of food on individual prongs. It should also be noted that the spacing between the prongs can vary: a four-pronged skewer, for instance, might have a distance of 2 inches between the first and second prongs, then a spacing of three inches between the second and third prongs, and then a spacing of 2 inches between the third and fourth prongs. Such spacing would allow foods suitable for cooking on a single food holding portion 30c such as small shrimp, to be cooked alongside flat pieces of bread such as Indian naan, for instance. Thus, multi-pronged skewers 60 are convenient for the cook, as a single flip with the handling device can turn multiple foods over with a single squeeze of the handles.

Figure 11:
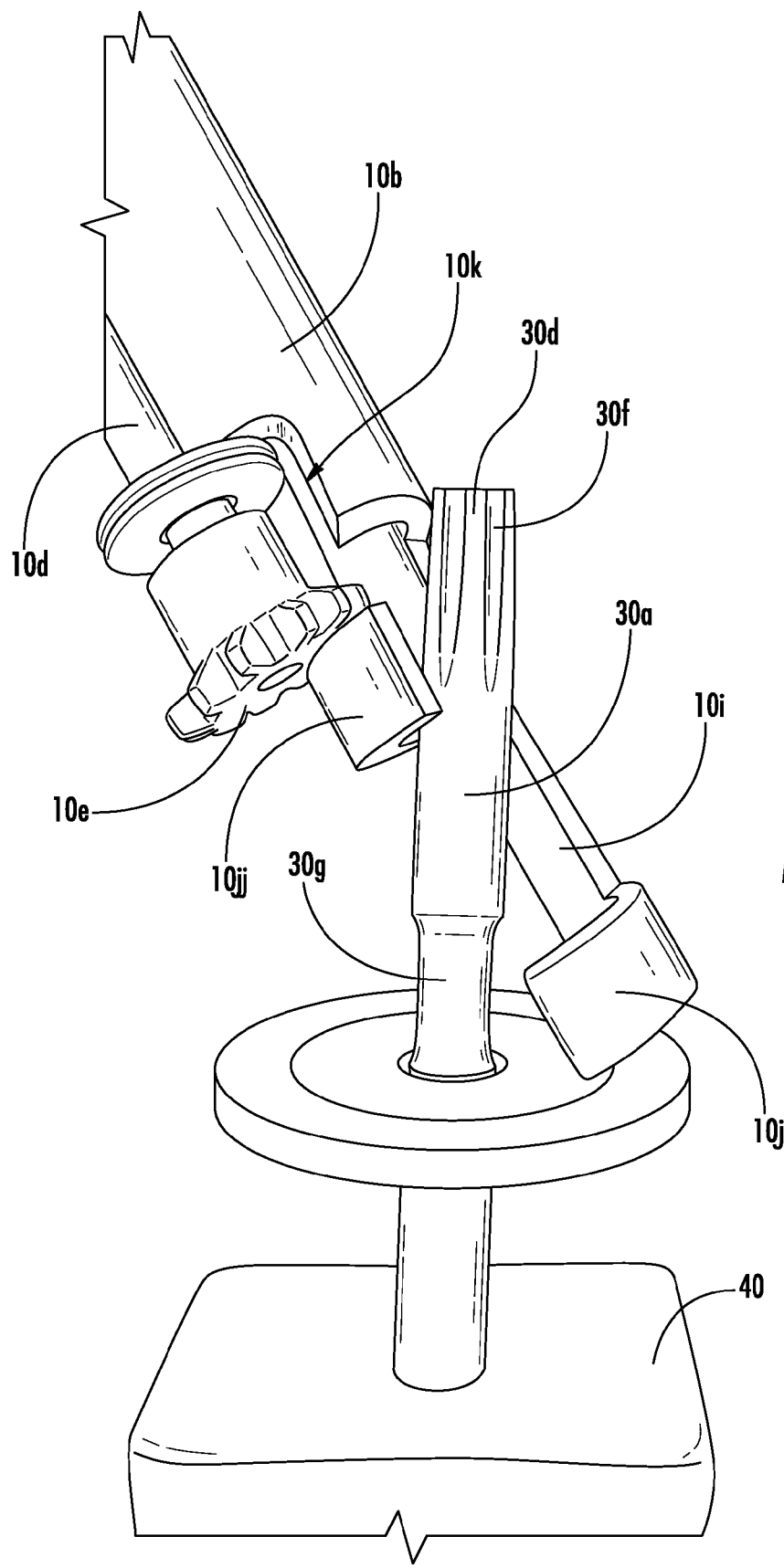
FIGS. 11-13 are side elevation views showing the three step process of coupling the mating shank of the improved skewer to the skewer engaging portion of the skewer handling device.
Figure 12:
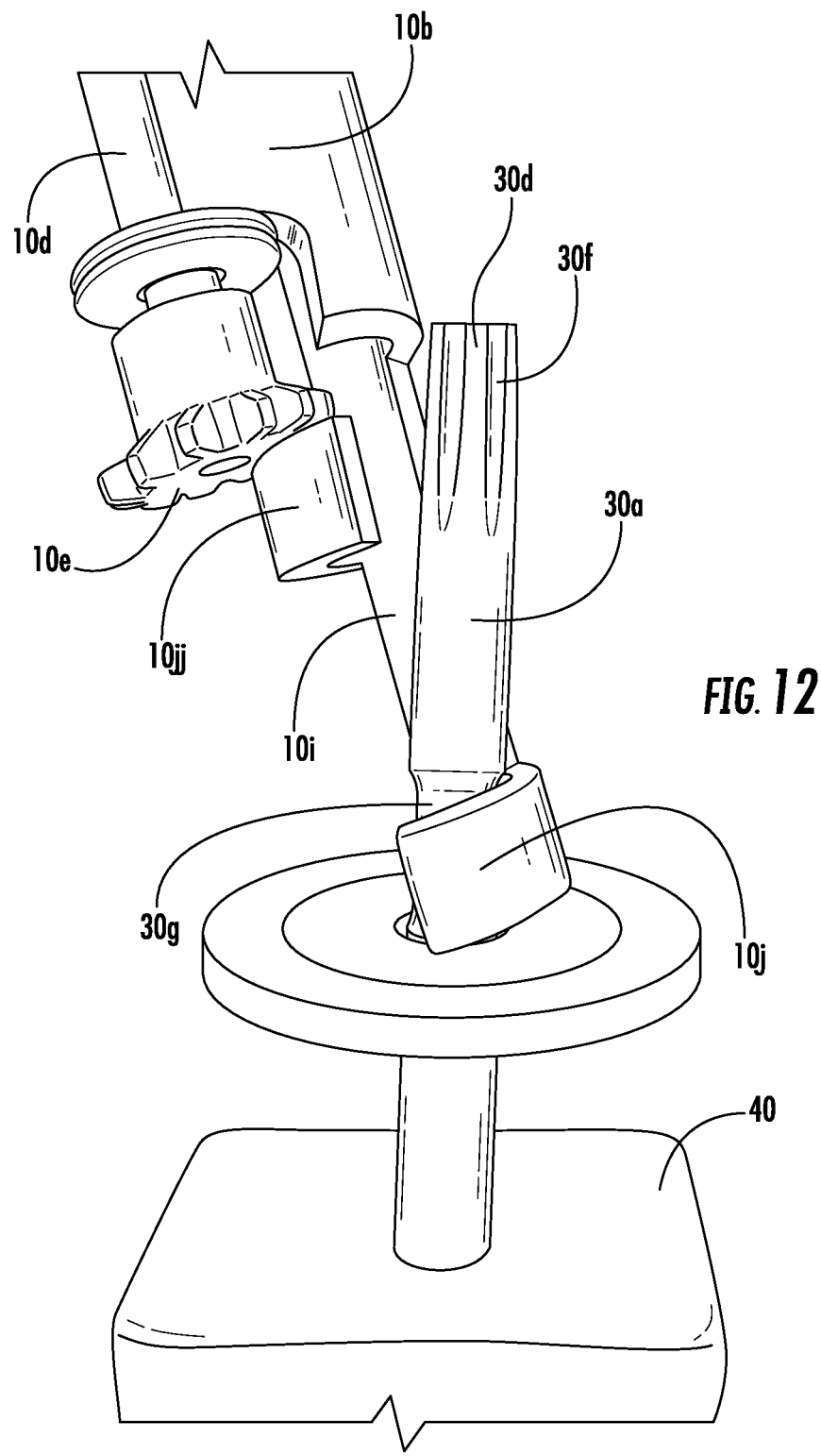
Figure 13:
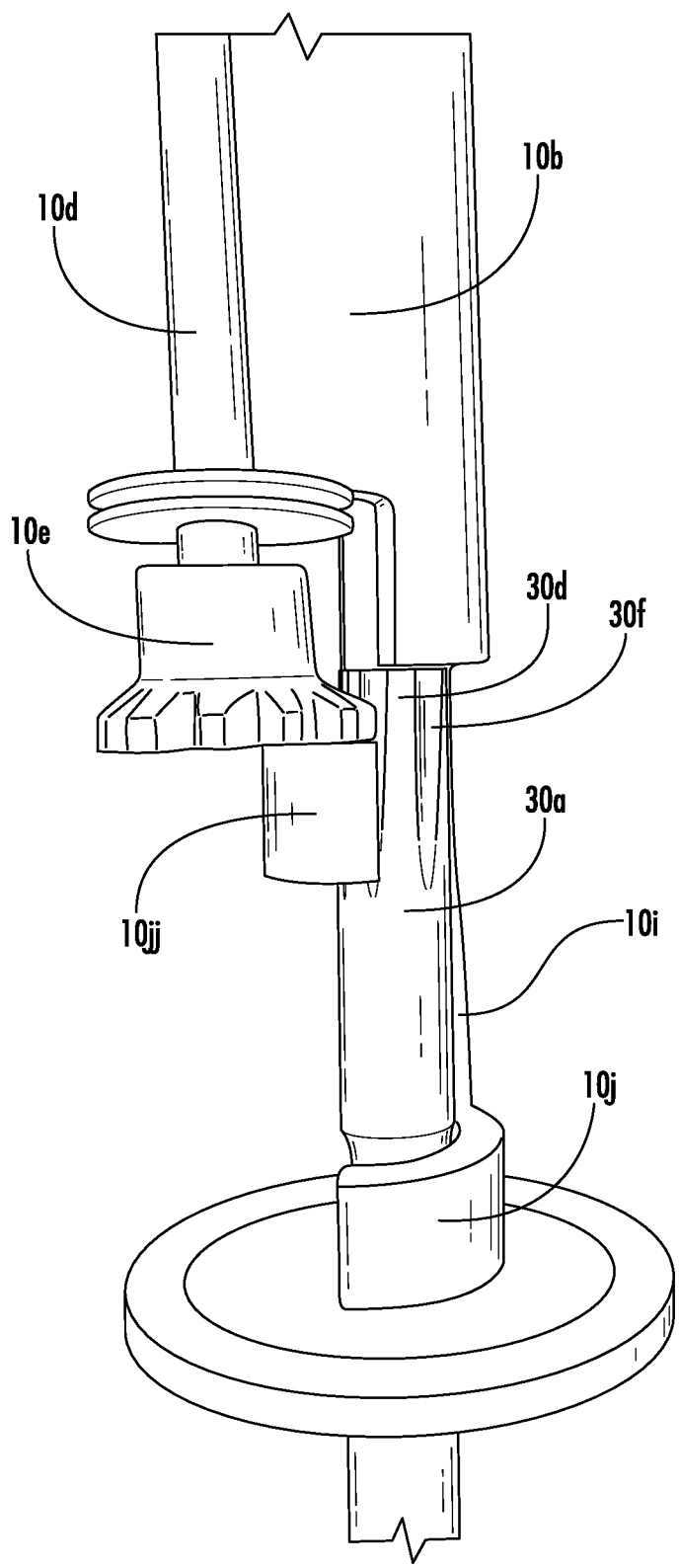

Looking now at FIGS. 11-13, to use the improved skewer 30 60 with the skewer handling device 10, an operator grasps the handles 10a 10aa of the handling device 10 in a palm of one hand, angling the distal end of the handling device downwards (FIG. 11) to slide the mating shank 30a of the skewer 30 60 against the primary guide 10j and support 10i (FIG. 12) of the handing device 10, until the mating surfaces 30d 30f engages the skewer engaging means 10e and the guide rest 30g couples with the primary guide 10j (FIG. 13). The skewer 30 60 is now secured to the handling device 10 via the coupling of the guide rest 30g and the primary guide 10j and the meshing of the mating surfaces 30d 30f with the teeth 10ee of the skewer engaging means 10e.

The operator then lifts the skewer-handling device assembly. Squeezing the handles 10a 10aa together causes the pinion 20b to traverse the rack 20a, shortening the distance between the proximate ends of the handles 10a 10aa, and compressing the spring 10f. The turning pinion 20b rotates the rod 10d and the attached skewer engaging means 10e in a likewise manner, the meshing teeth 10ee of the skewer engaging means and the mating surfaces 30d 30f of the mating shank 30a force the skewer 30 60 to turn in a same single rotation. The handling device can be adjusted so that the full travel distance of the pinion along the rack is achieved with a single squeeze of the handles, or lesser distances determined by the spacing between each tooth 20c of the rack 20a, and/or by the spacing and arrangement of teeth along the skewer engaging means. Arrangements of the mating surfaces 20a 20b 10ee 30d 30f can be selected so as to configure the handling device and improved skewer so as to allow the operator to rotate the skewer or shish kebob as little as a few degrees or up to an entire 360 degree rotation, although typically the entire travel distance of the rack with a single squeeze of the handles corresponds to a less than a 360 degree rotation of the skewer or shish kebob per total length of the rack traveled by the pinion.

Relaxing the hand grip allows the spring to decompress and the pinion 20b to travel back to its starting point, but the mating shank does not rotate backwards following the travel direction of the pinion due to a release 20c affixed to the rod, which limits the rotational direction of the rod. A suitable direction-limiting one way bearing part number EWC0406 is made by Boca Bearings, 1420 Neptune Drive, Suite A, Boynton Beach Fla., 33426 which prevents the rod from rotating backwards. In some other embodiments, the release 20c is configured to allow the operator to choose the rotational direction of the mating shank. Multiple rotations are easily and quickly performed by the operator alternating between relaxing and squeezing the handles, as desired.

In a typical embodiment, a full squeeze of the handles 10a 10aa causes the skewer to rotate a full 180 degrees, which is useful for cooking flat or thin portions of food, such as shrimp or chicken thighs, and lesser squeezes allow the skewer to be rotated in smaller increments, such as quarter turns, which is useful for cooking thick chunks of food, or food suitable for lesser rotations, such as corn on the cob, grape tomatoes, and cubes of meat. In either case, the handling device thus allows the operator to accurately rotate hot shish kebobs as desired.

Once the shish kebob or skewer is supported, either by holding it at the tip or with horizontal support below, such as when placed on a grill or on a plate, the handling device 10 is removed by tilting the device upwards so as to release the skewer's mating shank from the guide 10h and the skewer engaging means 10e.

The improved skewer and skewer handling device is typically provided as a kit, although individual skewers and handling devices can be provided separately. In yet another embodiment, shown in FIGS. 9 and 10, a conversion piece or adaptor 50 is provided, comprising the mating shank 30a and a skewer holding means 50a, with an optional flange. The adaptor 50 could be provided separately or as part of a kit, so as to allow conversion of conventional skewers into improved skewers according to the invention.

An existing skewer 52 54 is made compatible with the mating means of the handling device by sliding the non-tip end of the skewer into the holding means 50a of the adaptor 50. The holding means could simply be a blind hole formed into the mating shank 30a, for instance, when using a wooden skewer 54 with sharp tips at either end, or some other suitable structure designed to grip the non-tip end, such as a cup-like structure shown in FIG. 9. The holding means 50a must be able to hold the skewer end securely for proper operation with the handling device. The inventor notes that metal skewers 52 with a loop 52a formed in the end could be made compatible with the handling device 10 by providing the holding means as a clamping washer and a wing nut or other suitable fastener, where the wing nut and clamping washer are positioned so as to secure the loop 52a of the metal skewer 52. There are many possible ways of converting an existing skewer into an improved skewer 30 60 according to the invention, and the examples listed are not meant to be an exhaustive list of acceptable ways of removably adding a mating shank to an existing skewer.

The inventor notes that the handle portion of the handling device 10 has many possible and acceptable configurations, and the use of a linear actuator 20 here configured as a rack and pinion system coupled with the return spring is an advantageous arrangement that allows for single-handed use of the device, but the inventor emphasizes that any means capable of rotating the rod in order to rotate the skewer can be used, and the Figures are not meant to limit the rotating means to linear actuators, rack and pinion systems, or even to gear sets. For instance, a two-handed embodiment of the handling device could be configured as the rod 10*d* disposed inside the shaft with a handle portion such as a wheel or crank at the uppermost end of the rod, and the handle portion simply rotated clockwise or counterclockwise with one hand while the operator's other hand holds the shaft. Another possible two-handed solution retains the linear actuator 20 but removes the spring, so the linear actuator is engaged by pulling the handles apart then pushing them together again, in a scissor-like motion. Many handle configurations are acceptable so long as the mating shank 30*a* on the skewer 30 60 couples with the skewer engaging means 10*e* at the end of the rotatable rod so that movement of at least one handle rotates the rod and thus the skewer.

The use of gear sets in the Figures for turning the improved skewer 30 60 is one embodiment of the invention and not meant to limit the mating systems of the invention to gear sets. The skewer engaging means 10*e* could be as simple as a magnet holding and engaging the metal mating shank of the skewer, or two magnets, one on the skewer engaging means and one on the mating shank. Other possible configurations of the skewer engaging means include a rubberized wheel that applies pressure to the mating shank when the primary guide 10*j* is coupled to the guide rest 30*g*, and rotation of the rod rotates the wheel which then turns the skewer. The mating shank could be provided with a pitted or sticky surface to better allow the wheel to turn the skewer. The skewer engaging means can even be configured as a wheel with an array of slots sized and shaped to receive a compatible array of extended fingers of the mating shank, thus securely coupling the skewer to the handling tool. Hence, the mating surfaces on both the mating shank and the skewer engaging means, shown in the Figures as an array of grooves and/or teeth is simply one embodiment, and is not meant by the inventor to limit the coupling of the skewer to the handling device to just gear sets and meshing teeth/grooves.

The inventor notes that the guide 10*h* and guide rest 30*g* are critical features of the invention, as they maintain the position of the skewer-handling device mating systems. The guide 10*h* is shown in the Figures as a pair of spaced apart c-channel guides 10*j* 10*jj*, conforming to the cylindrical shape of the guide rest 30*g* however it should be noted that so long as the primary guide 10*j* and guide rest are configured so as to securely maintain the position of the skewer vis à vis the handling device, the guide 10*j* and guide rest 30*g* can be a variety of different shapes and dimensions. The inventor notes that a typical guide width is a same width as that of a portion of the mating shank 30*a* upon which the mating surfaces are formed so as to securely couple the skewer-handling device mating systems.

It is to be understood that the above-described arrangements are only illustrative of the application of the principles of the present invention. Numerous modifications and alternative arrangements may be devised by those skilled in the art without departing from the scope of the present invention.

What is claimed is:

1. An apparatus (10) for manipulating a skewer (30 60), the skewer having a mating shank and a guide rest (30*g*) at one end (30*a*), the apparatus comprising:
   a rod (10*d*) having a proximal end and a distal end;
   a skewer coupling mechanism (10*e*) affixed to the distal end of the rod;
   a handle affixed to the proximal end of the rod, the handle further provided with a spring (10*f*) having a spring compression;
   a linear actuator coupled to both the handle and the proximal end of the rod;
   a shaft (10*b*) having a first end and a second end, the shaft at the first end affixed to the handle; and
   a guide (10*h*) formed at the second end of the shaft parallel to the rod (10*d*) and in spaced-apart relationship with at least one of the skewer coupling mechanism (10*e*) and the rod (10*d*);
   wherein the guide further comprises a support (10*i*) with a primary guide (10*j*) formed thereon calculated to mate with the guide rest (30*g*) of the skewer;
   wherein the rod is rotatably coupled to the linear actuator;
   wherein the linear actuator rotates the rod when a user's hand squeezes the handle, changing the spring compression of the spring; and
   wherein the skewer is rotated when the rod is rotated by the linear actuator when prior to rotation of the rod, the skewer is mated to the apparatus by the mating of the mating shank to the skewer coupling mechanism and the mating of the guide rest with the primary guide.

2. The apparatus in claim 1, wherein the linear actuator is comprised of:
   a pinion (20*b*) affixed to the proximal end; and
   a rack (20*a*) positioned so as to engage the pinion (20*b*);
   wherein the change of the spring compression rotates the pinion along the rack and rotates the rod.

3. The apparatus of claim 1, wherein the spaced-apart relationship of the guide (10*h*) to the skewer coupling mechanism (10*e*) is a same width as a width of the mating shank (30*a*).

4. The apparatus of claim 1, wherein the mating shank (30*a*) is further comprised of an array of mating surfaces (30*f* 30*d*) formed at a terminal end (30*e*) of the mating shank.

5. A skewer (30 60) for holding portions of food, the skewer comprising:
   a food holding portion (30*c*) having a tip (30*h*) at one end and a mating shank (30*a*) at an opposing end; and
   a guide rest (30*g*) positioned between the food holding portion and the mating shank;
   wherein the mating shank further comprises an array of mating surfaces configured to mate with an array of compatible mating surfaces of the skewer coupling mechanism (10*e*) of claim 1; and
   wherein the guide rest is selected to couple with the guide (10*h*) of claim 1.

6. An adaptor (50) for a skewer (52 54), comprising:
   a mating shank (30*a*) having a first end and a second end, an array of mating surfaces configured to mate with an array of compatible mating surfaces of the skewer coupling mechanism (10*e*) formed at the first end of the mating shank; and
   a skewer holder (50*a*) for receiving and holding a terminal end of a skewer (52 54) opposite a prong end of the skewer, the terminal end affixed to the second end of the mating shank.

7. The skewer of claim 5 used with the apparatus of claim 1.

8. The adaptor of claim 6 for use with the apparatus of claim 1.

9. The apparatus of claim 1, wherein the mating shank is further comprised of an array of mating surfaces, and wherein the skewer coupling mechanism is a gear having teeth selected to mate with the array of mating surfaces of the mating shank.

\* \* \* \* \*